US012078227B2

(12) United States Patent
Mclain (10) Patent No.: US 12,078,227 B2
(45) Date of Patent: Sep. 3, 2024

(54) ADJUSTABLE STROKE DEVICE WITH CAM

(71) Applicant: Lake Country Tool, LLC, Oconomowoc, WI (US)

(72) Inventor: Scott S. Mclain, Mukwonago, WI (US)

(73) Assignee: Lake Country Tool, LLC, Oconomowoc, WI (US)

( * ) Notice: Subject to any disclaimer, the term of this patent is extended or adjusted under 35 U.S.C. 154(b) by 867 days.

(21) Appl. No.: 17/152,976

(22) Filed: Jan. 20, 2021

(65) Prior Publication Data

US 2022/0228653 A1     Jul. 21, 2022

(51) Int. Cl.
*F16H 25/00* (2006.01)
*B25F 5/02* (2006.01)
*F16H 25/10* (2006.01)
*H02K 7/116* (2006.01)
*B25F 5/00* (2006.01)

(52) U.S. Cl.
CPC ............... *F16H 25/10* (2013.01); *B25F 5/02* (2013.01); *H02K 7/116* (2013.01); *B25F 5/001* (2013.01)

(58) Field of Classification Search
CPC ........ B24B 23/04; B24B 41/042; F16H 25/10
See application file for complete search history.

(56) References Cited

U.S. PATENT DOCUMENTS

| 169,753 | A | 11/1875 | White |
| 3,898,887 | A | 8/1975 | Grant |
| 4,328,718 | A | 5/1982 | Robinson et al. |
| 4,610,111 | A | 9/1986 | Cox |
| 5,020,281 | A | 6/1991 | Neff |
| 5,134,777 | A | 8/1992 | Meyer et al. |
| 5,879,228 | A | 3/1999 | Sun |
| 5,904,027 | A | 5/1999 | Bonde |

(Continued)

FOREIGN PATENT DOCUMENTS

| DE | 102004055271 A1 | 5/2006 |
| EA | 2072183 A1 | 6/2009 |

(Continued)

OTHER PUBLICATIONS

European Search Report dated Mar. 26, 2019 in corresponding European Application No. 18203189.8.

(Continued)

*Primary Examiner* — Eyamindae C Jallow
(74) *Attorney, Agent, or Firm* — Harness, Dickey & Pierce, P.L.C.

(57) ABSTRACT

An adjustable stroke device for a random orbital machine has a housing with a central axis and a wall defining a cavity. At least one counterweight is movably disposed at least partially within the cavity. A mounting assembly is disposed at least partially within the cavity. The mounting assembly has a workpiece attachment mechanism. A stroke adjuster couples the at least one counterweight with the mounting assembly. The stroke adjuster enables the at least one counterweight and mounting assembly to move with respect to one another such that a distance between the at least one counterweight and the mounting assembly may be variably adjusted which, in turn, variably adjust a stroke radius of the workpiece attachment mechanism with respect to the central axis of the housing. The stroke adjuster has an adjuster ring and a cam mechanism secured with the adjuster ring.

22 Claims, 9 Drawing Sheets

(56) References Cited

U.S. PATENT DOCUMENTS

| | | |
|---|---|---|
| 5,947,804 A | 9/1999 | Fukinuki et al. |
| 6,062,960 A | 5/2000 | Kai et al. |
| 6,089,065 A | 7/2000 | Deriaz |
| 6,206,771 B1 | 3/2001 | Lehman |
| 6,796,203 B2 | 9/2004 | Dubrowskij |
| 7,238,095 B1 | 7/2007 | Sun et al. |
| 7,241,209 B2 | 7/2007 | Wiltshire |
| 8,740,669 B2 | 6/2014 | McFadden et al. |
| 10,144,106 B2 | 12/2018 | McLain et al. |
| 2004/0187324 A1 | 9/2004 | James et al. |
| 2005/0090190 A1 | 4/2005 | Rudolph |
| 2005/0197052 A1 | 9/2005 | Lampka et al. |
| 2005/0245182 A1 | 11/2005 | Deshpande et al. |
| 2006/0289264 A1 | 12/2006 | Zhong |
| 2007/0224924 A1 | 9/2007 | Hoglund |
| 2008/0057842 A1 | 3/2008 | Lampka et al. |
| 2017/0120413 A1 | 5/2017 | McLain et al. |
| 2018/0339396 A1 | 11/2018 | McLain et al. |
| 2019/0128392 A1* | 5/2019 | McLain .................. B24B 23/03 |
| 2020/0072292 A1* | 3/2020 | McLain .................. F16H 25/04 |

FOREIGN PATENT DOCUMENTS

| | | |
|---|---|---|
| EP | 0 157 532 A1 | 10/1985 |
| EP | 0 820 838 A1 | 1/1998 |
| EP | 1 688 217 A2 | 8/2006 |
| EP | 2 127 808 A1 | 12/2009 |
| EP | 3162499 A2 | 5/2017 |
| GB | 2 420 518 A | 5/2006 |
| JP | 2001-179591 A | 7/2001 |
| WO | WO-99/21686 A1 | 5/1999 |

OTHER PUBLICATIONS

European Search Report dated Oct. 14, 2022 in corresponding European Application No. 22151499.5.

* cited by examiner

ADJUSTABLE STROKE DEVICE WITH CAM

FIELD

The present disclosure relates to adjustable orbital devices including, but not limited to polishers, buffers, sanders and massagers.

BACKGROUND

The present disclosure relates to an apparatus for adjusting the stroke of random orbital machine, such as, but limited to, polishing machines, sanding machines and massaging machines. The adjustability allows the user to define the stroke of the random orbital machine and adjust it between a maximum definitive stroke setting and a minimum 0 orbital setting.

Polishing machines and sanding machines are routinely used in the automotive detailing industry and home building industry to correct imperfections in the paint or drywall and to apply polishes and waxes. There are three primary machines used, including rotary buffers, random orbital machines, and dual action machines. Each tool has its place, as the manner in which the pad spins on each machine is unique and used for different purposes.

Rotary buffers are the fastest and most effective machine for removing paint defects in a controlled manner with good results. The drive unit used in a rotary buffer is directly connected to the pad and each one is in axial alignment with each other. In order to correct paint scratches, the rotary buffer is commonly used to remove enough paint surrounding the scratches to make the surface level. Removing scratches, however, requires more skill and control of the machine than a typical hobbyist possesses. For this reason, rotary buffers are commonly avoided by average users as it is very easy to remove too much paint and damage the finish by causing swirl marks or by burning the paint.

Random orbital machines were introduced in order to meet the needs of an average user, as they require less experience and control to operate. A random orbital machine uses a gear case that employs two unique mechanisms which move a pad attached to a backing plate. Unlike a rotary buffer, random orbital machines place the central rotational axis of the pad and the backing plate offset from the driveshaft of the machine. This offset is commonly referred to as the "stroke". As a result, the backing plate and pad orbit the driveshaft in a circular motion. At the same time, the pad randomly spins, as it is mounted on an idle bearing. This random spinning varies with pressure applied on the pad and is not directly powered. The result is a polishing action that will not burn or cut through the paint as it will not produce the heat from a powered spinning action. Random orbital machines are, therefore, much safer and dramatically less likely to cause swirls or burn through the paint.

Similar to random orbital machines, dual action machines place the central rotational axis of the pad and the backing plate offset from the driveshaft. As a result of this stroke, the backing plate and pad orbit the driveshaft in a circular motion. However, with a dual action machine the spinning of the pad is directly powered.

At the heart of a random orbital machine is the machine's stroke. The stroke is determined by the offset between the driveshaft axis and the backing axis. A longer offset or stroke places the backing plate rotational axis farther away from the driveshaft axis. Multiplying the offset by two produces the stroke diameter. The "stroke" is, therefore, a term that identifies the diameter of the path the backing plate travels as it orbits around the driveshaft.

A majority of random orbital machines are small stroke machines, which mean they use a stroke length that measures somewhere between approximately 6 mm-12 mm. A small stroke machine limits the movement of the pad to a smaller and tighter orbit. This results in a smoother action. A small stroke machine is also easier to control because the backing plate orbits around the driveshaft rotational axis in a tighter path. There are less vibrations and movement making the machine easier to hold due to the smoother action.

A large stroke machine delivers increased orbits per minute (OPM) of backing plate motion using the same rotations per minute (RPM), as the orbit of the backing plate and the pad around the drive shaft is increased. A large stroke also increases movement of the pad which helps spread out polishing compounds and treats a larger surface area. It also accomplishes more cutting action into the paint which allows for scratches and paint defects to be corrected. Small stroke machines typically only polish the paint and do not cut into it, and, therefore, are not able to remove surface defects.

One method of addressing the deficiencies of a small stroke has been to increase the RPM of the machine. While this increases the rotation of the motor, the machine stroke stays the same. There are also longevity issues associated with increased RPM for the motor and increased OPM for the pad. Increasing the RPM puts more strain on the motor, while increased OPM burns out a pad faster.

In sum, both long stroke and short stroke machines have their place in the industry. Therefore, what is needed is a machine that can be adjusted by the user without special tools or disassembly of the machine. Finally, what is needed is a compact, simple, and effective method to adjust the stroke of a machine based on the needs of the user.

SUMMARY

Accordingly to the disclosure, an adjustable stroke device for a random orbital machine comprises a housing having a central axis and a wall defining a cavity. The housing including a drive hub and cover. At least a counterweight is movably disposed at least partially within the cavity. A mounting assembly is disposed at least partially within the cavity. The mounting assembly includes a workpiece attachment mechanism. A stroke adjuster couples the at least one counterweight with the mounting assembly. The stroke adjuster enables the at least one counterweight and mounting assembly to move with respect to one another such that a distance between the at least one counterweight and the mounting assembly may be variable adjusted which, in turn, variable adjust the stroke radius of the workpiece attachment mechanism with respect to the central axis of the housing. The stroke adjuster includes an adjuster ring and a cam mechanism secured to the adjuster ring. The adjuster ring surrounds the wall of the housing. The adjuster ring is only rotatable around the central axis. The counterweight engages the cam mechanism which moves the counterweight in response to cam movement. The mounting assembly includes a bearing carriage engaging the cam mechanism. The mounting assembly moves in response to cam movement. The workpiece attachment mechanism further comprises a spindle coupling with the bearing carriage. A locking mechanism is associate with the mounting assembly to lock the drive in a rotational only position. The cam mechanism is directly secured to the stroke adjuster. At least one detent secures the stroke adjuster in position. Preferably a plurality of detents is used with each detent securing the stroke adjuster in a different separate position. The counterweight is fully disposed in the cavity.

Accordingly to a second embodiment, a rotating tool comprises a housing and the motor, the motor including a drivetrain. An adjustable stroke device is coupled with the drivetrain. The adjustable stroke device comprises a housing having a central axis and a wall defining a cavity. The housing including a drive hub and cover. The drive hub is rotatably coupled with the drive train. At least a counterweight is movably disposed at least partially within the cavity. A mounting assembly is disposed at least partially within the cavity. The mounting assembly includes a workpiece attachment mechanism. A stroke adjuster couples the at least one counterweight with the mounting assembly. The stroke adjuster enables the at least one counterweight and mounting assembly to move with respect to one another such that a distance between the at least one counterweight and the mounting assembly may be variable adjusted which, in turn, variable adjust the stroke radius of the workpiece attachment mechanism with respect to the central axis of the housing. The stroke adjuster includes an adjuster ring and a cam mechanism secured to the adjuster ring. The adjuster ring surrounds the wall of the housing. The adjuster ring is only rotatable around the central axis. The counterweight engages the cam mechanism which moves the counterweight in response to cam movement. The mounting assembly includes a bearing carriage engaging the cam mechanism. The mounting assembly moves in response to cam movement. The workpiece attachment mechanism further comprises a spindle coupling with the bearing carriage. A locking mechanism is associate with the mounting assembly to lock the drive in a rotational only position. The cam mechanism is directly secured to the stroke adjuster. At least one detent secures the stroke adjuster in position. Preferably a plurality of detents is used with each detent securing the stroke adjuster in a different separate position. The counterweight is fully disposed in the cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Turning to the figures, a tool is illustrated with an adjustable stroke device and is designated with the reference numeral 10. The tool includes a motor 12, a power source 14 and a switch 16 for activating and deactivating the power source. The power source is shown as a cord but could be rechargeable batteries. The motor includes a pinion 18 positioned inside the head housing 26 of the tool. The drivetrain head housing 26 includes a cavity to house a drivetrain 22. The drivetrain 22 includes a bevel gear 24 meshing with the pinion 18. The bevel gear 24 is coupled with the adjustment stroke device 30 which is mounted, via a housing 32, with the bottom of the head housing 26.

The adjustment stroke device 30 includes a drive hub 34, a workpiece mounting assembly 36, a counterbalance mechanism 38, a stroke adjustment mechanism 40 and a cover 42. The drive hub 34 and cover 42 form a housing defining a cavity.

The drive hub 34 includes a body 44 having a flange 46 and a pair of wings 48. A driveshaft 50 extends from the body 44 and a bearing 52. The flange 46 is positioned around an extending flange 31 on the housing 32. The driveshaft 50 passes through the housing 32 and is received by an additional bearing 54 in the drivetrain head housing 26. Ultimately, the driveshaft 50 is coupled with the bevel gear 24 to provide rotation to the drive hub 34.

The drive hub wings 48 are separated by openings that receive the wings 56 from the cover 42 to form the cylindrical housing.

Figure 9:
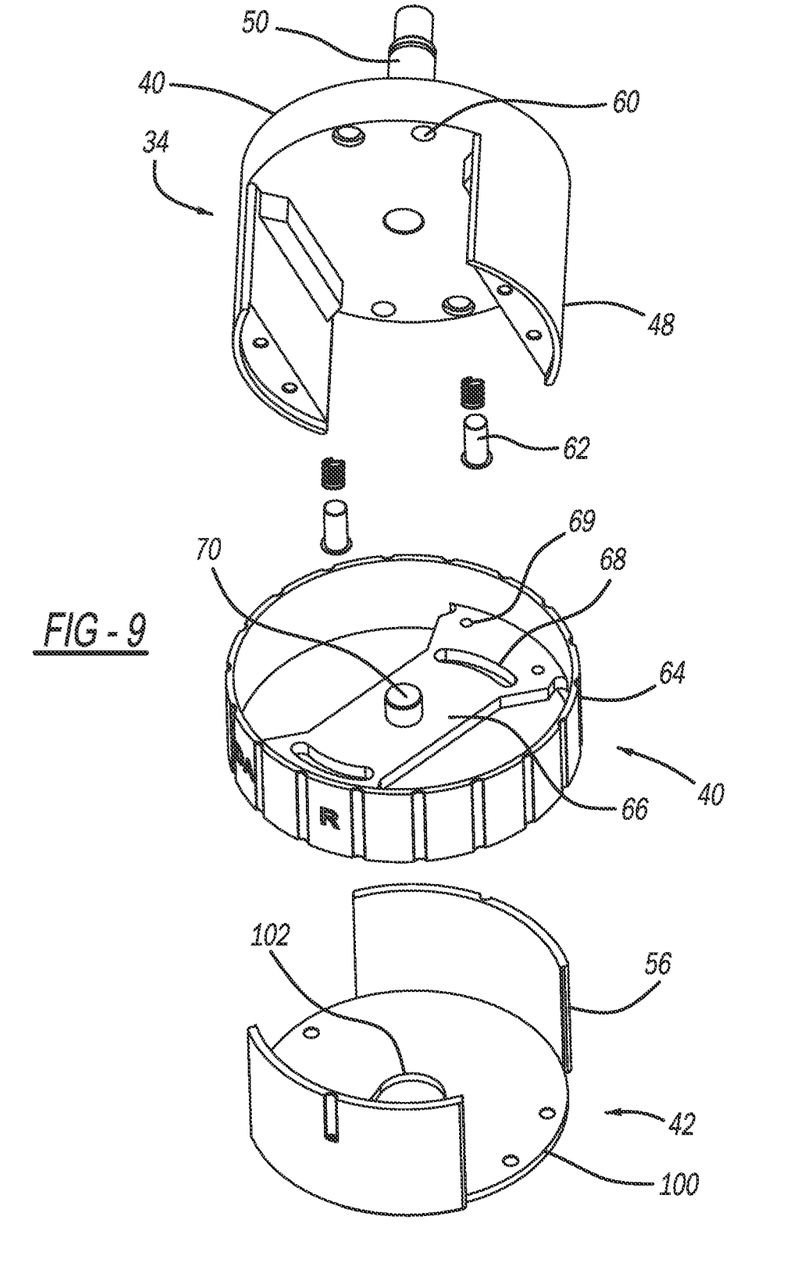
FIG. 9 is an exploded perspective of the adjustable stroke device housing.

An inner body surface 58 is formed on the body 44 between the wings 48 (see FIG. 9). The surface 58 provides a cutout to receive the cam plate 66 of the stroke adjustment mechanism 40. Also, the inner surface 58 includes a plurality of detent bores 60. Two detent bores 60 are shown, however depending upon the number of positions of the adjustable stroke device 30, more bores may be included. The detent bores 60 receive detent pins 62. The function of the detent pins 62 will be explained later.

Figure 1:
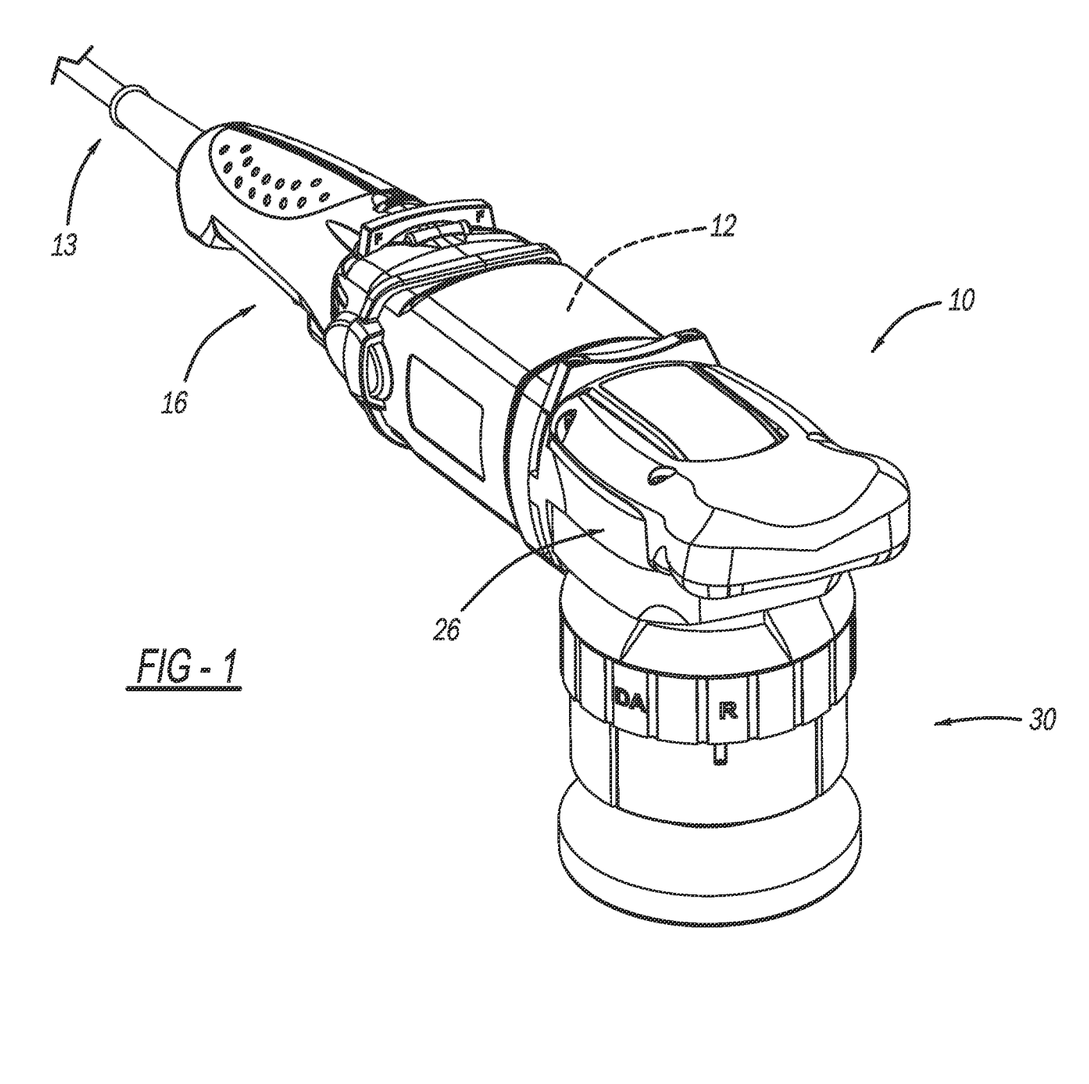
FIG. 1 is a perspective view of a rotating tool according to the disclosure.
Figure 2:
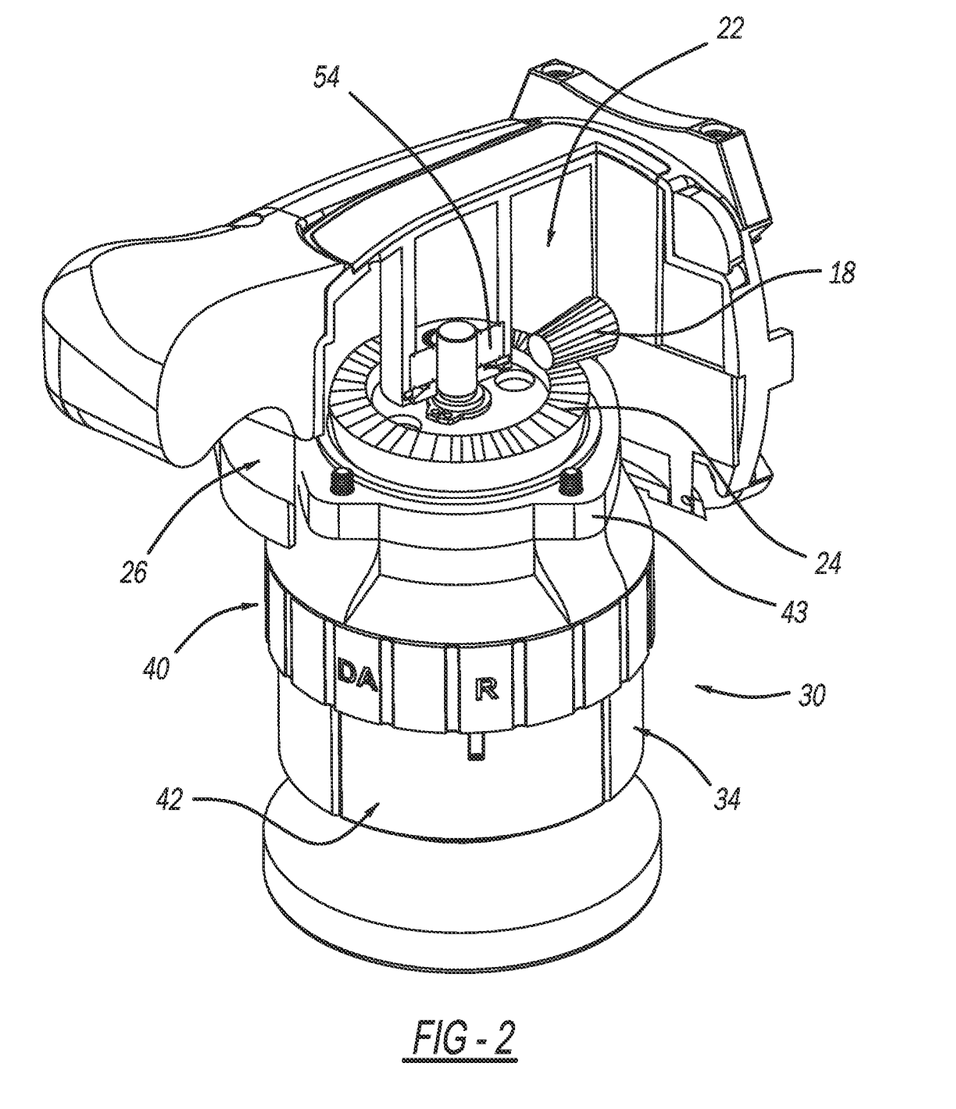
FIG. 2 is a perspective view partially in cross-section of the tool of FIG. 1.
Figure 3:
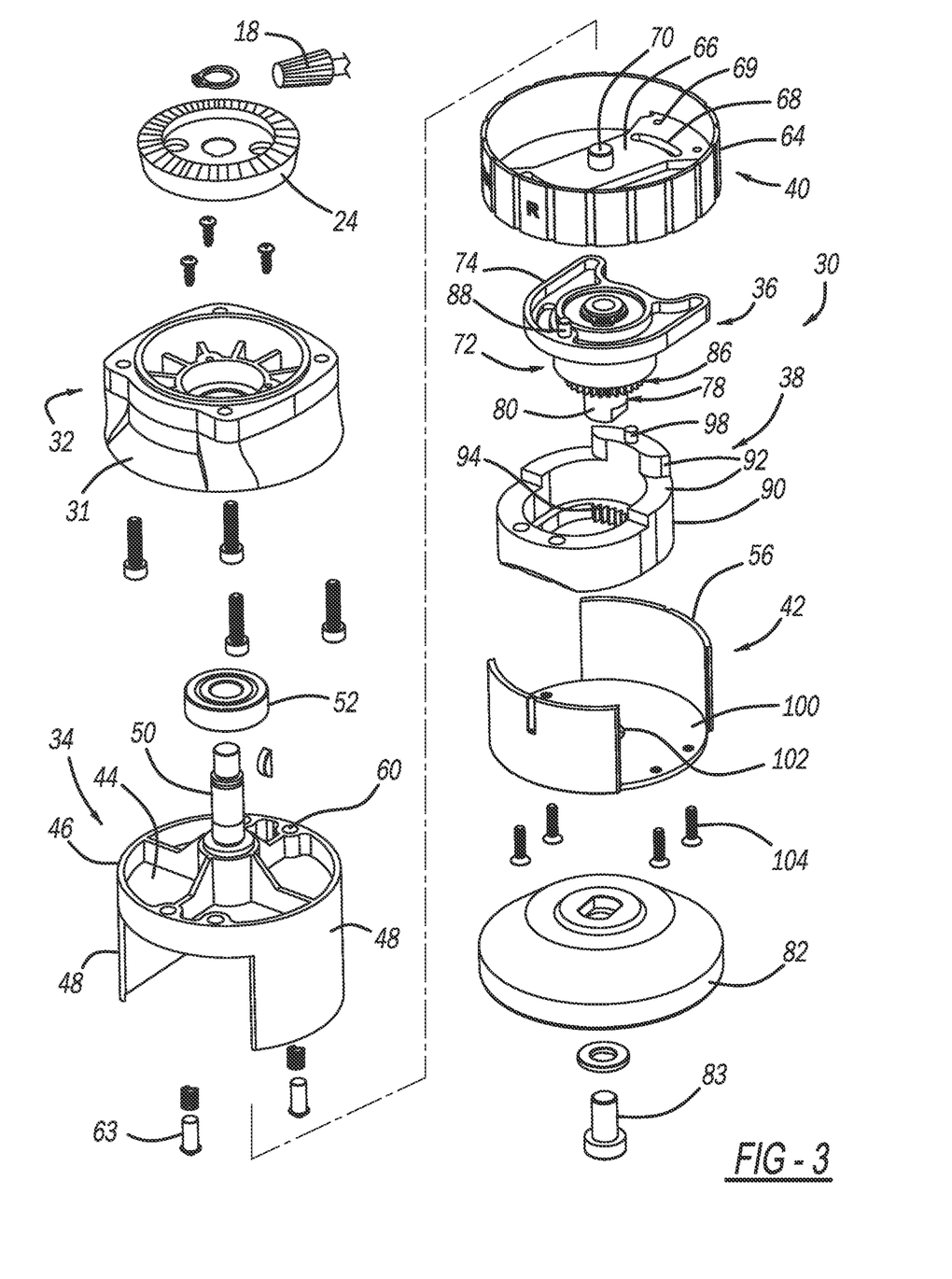
FIG. 3 is an exploded view of the adjustable stroke device.
Figure 4:
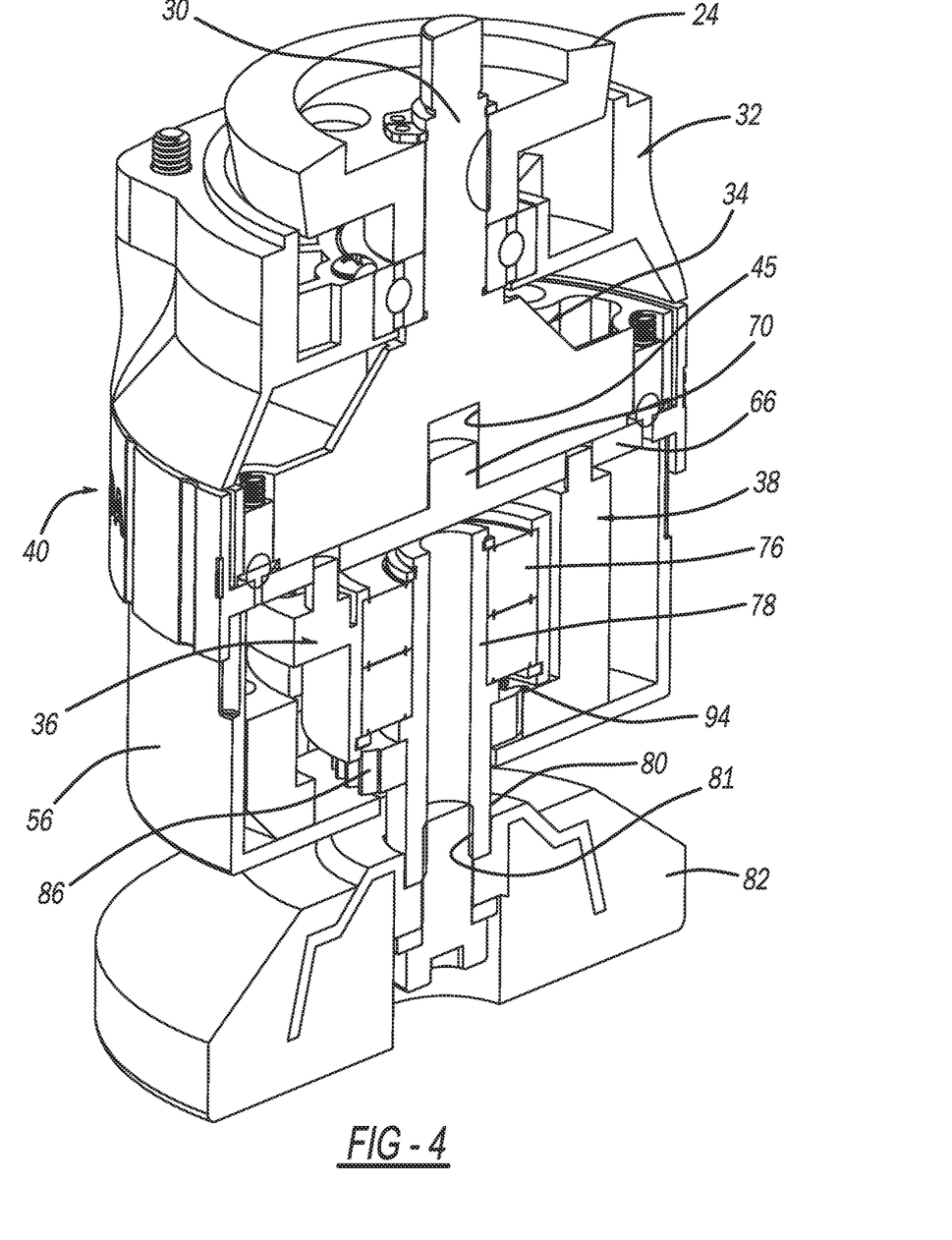
FIG. 4 is a cross-section view along line 4-4 of FIG. 1.

The stroke adjustment mechanism 40 includes a ring 64 and a cam 66. The ring 64 is positioned around the drive hub 34 and cover 42 as illustrated in FIG. 1. The ring 64 includes a cam plate 66 directly secured to the ring 64. The cam plate 66 includes cam slots 68 and detent holes 69. The ring 64 is manually manipulated, rotated, by the user to move the adjustable stroker device 30 between operating positions. Also, a shaft 70 extends from the cam plate 66. The shaft 65 fits in a bore 45 in the body 44. This enables rotation of the stroke adjustment mechanism 40 and the drive hub 34. The cam plate 66 secures the stroke adjustment mechanism 40 with the drive hub 34. Generally, this is accomplished via a C-clip.

The workpiece mounting assembly 36 includes a bearing carriage 72 and a U-shaped body portion 74. The bearing carriage 72 receives bearing 76 and a spindle 78. The spindle 78 extends through the bearings and bearing carriage 72. It has an external portion 80 that includes a threaded bore 81 to receive a backing plate 82 and fastener 83. The adjustment workpiece mounting assembly 36 also includes a locking gear 86. The locking gear 86 engages the counterbalance mechanism 38 to lock the workpiece mounting assembly 36 in a pure rotation position.

The U-shaped body portion 74 includes a pin 88. The pin 88 is received in one of the cam slots 68. Thus, the workpiece mounting assembly 34 is moved with respect to the counterbalance mechanism 38 upon rotation of the stroke adjustment mechanism 40.

Figure 5:
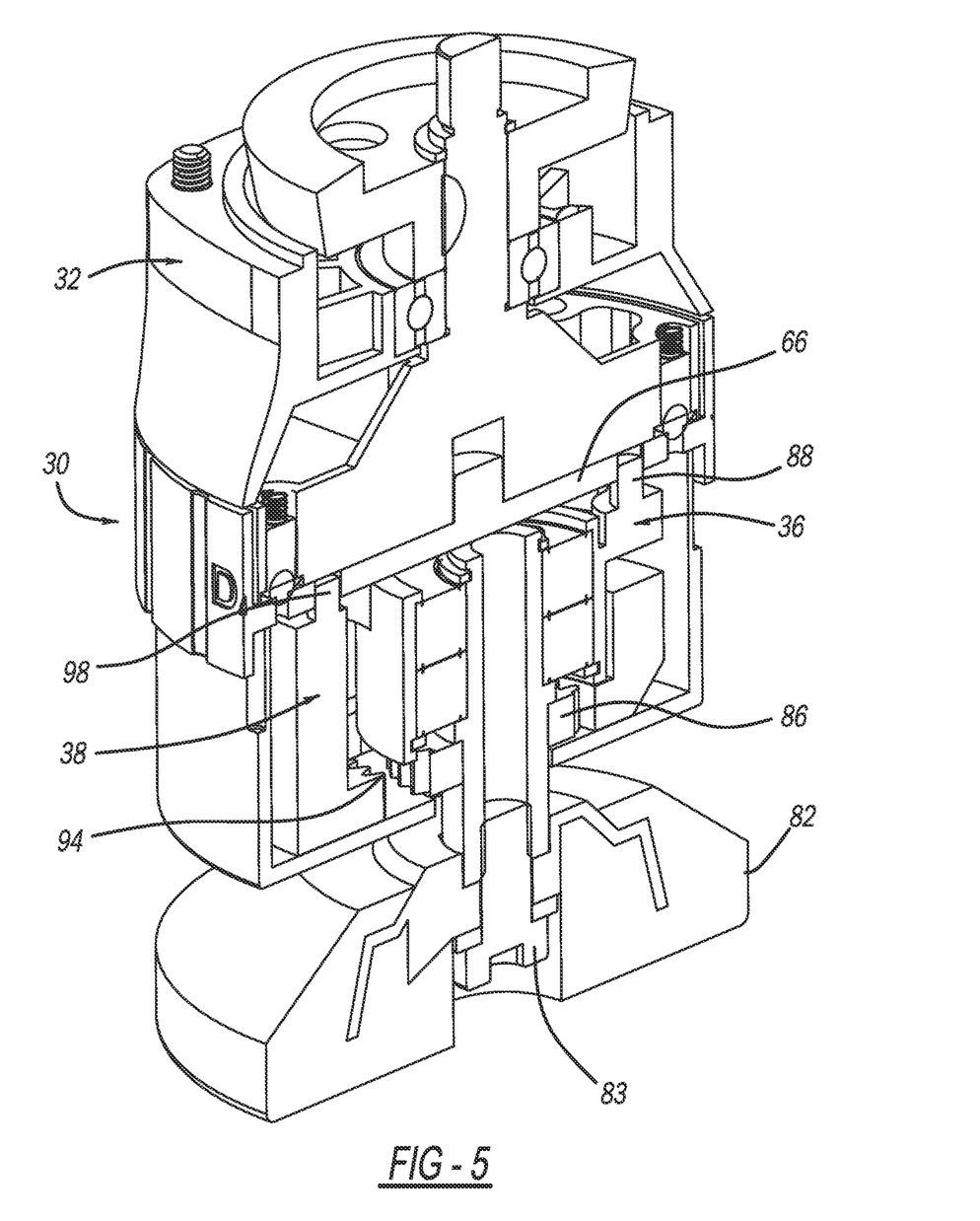
FIG. 5 is a cross-section view like FIG. 4 with the stroke adjustor rotated 180°.

The counterbalance mechanism 38 includes a body 90 with a plurality of step portions 92. The body 90 has an overall ring shape with an elliptical configuration. The inner surface of the body 90 includes a plurality of teeth 94. The teeth 94 engage with the locking gear 86 as mentioned above to position the adjustable stroke device 30 in a purely rotational position. One of the steps 92 include a pin 98 that is positioned in one of the cam slots 68. The pin 98 is positioned in the slot 68 opposite of the workpiece mounting assembly pin 88. Thus, as the stroke adjuster ring 64 is rotated, the counterbalance mechanism 38 and the workpiece mounting assembly 36 are moved away or towards one another. In the purely rotation position, the lock gear 86 engages the teeth 94 as illustrated in FIG. 5A.

The cover 42 includes a base 100 that covers the bottom of the stroke adjuster 30. The spindle portion 80 extends through the cover base opening 102 to enable connection with the backing plate 84. The cover wings 56 insert in the openings between the drive hub wings 48. This provides a substantially continuous cylindrical housing. The cover 42 is secured to the drive hub 34 via screws 104. Thus, the counterbalance mechanism 38 as well as the workpiece mounting assembly 36 are positioned inside of the cover 42 and drive hub 34 housing.

Figure 6:
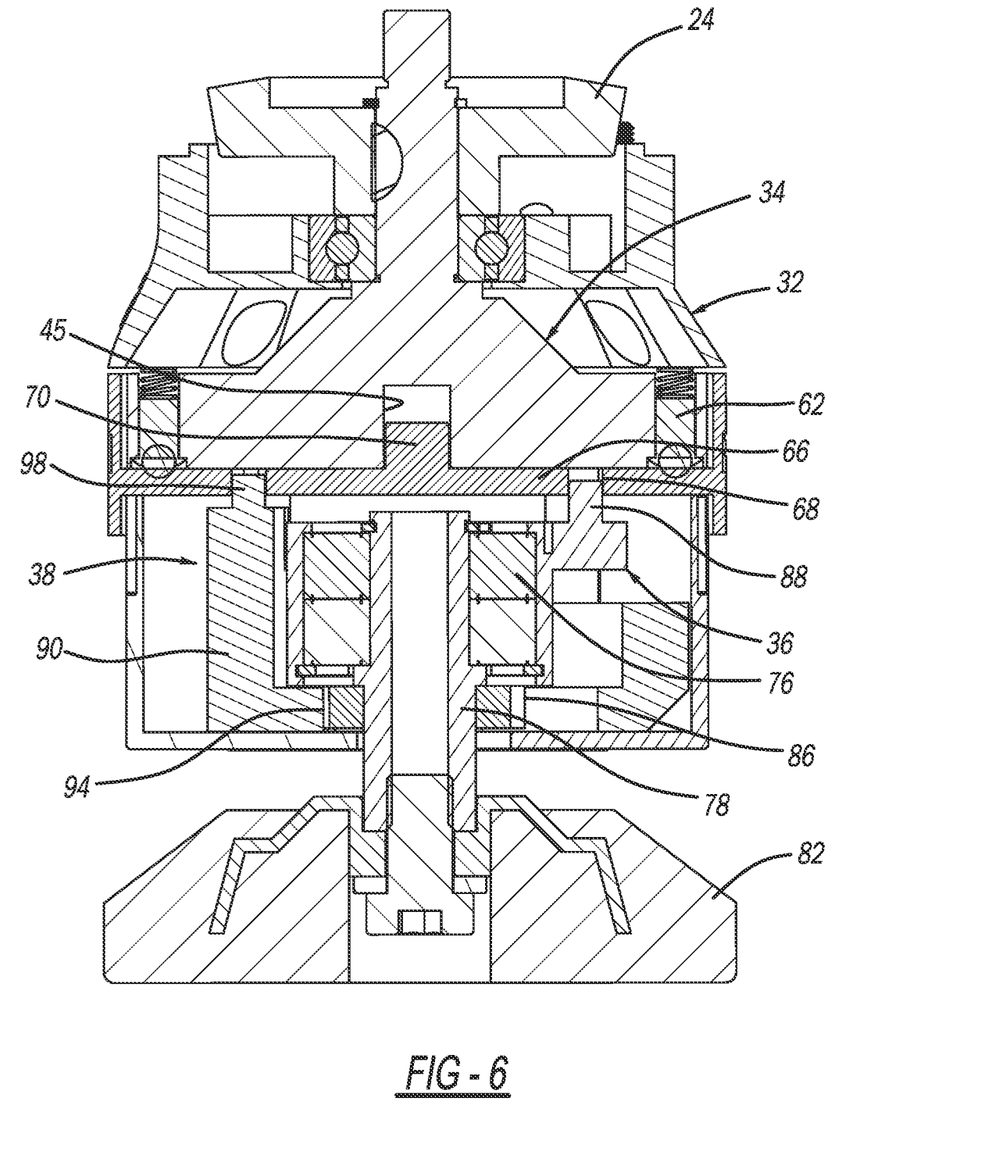
FIG. 6 is a cross-section view of FIG. 1 along line 6-6 thereof.
Figure 7:
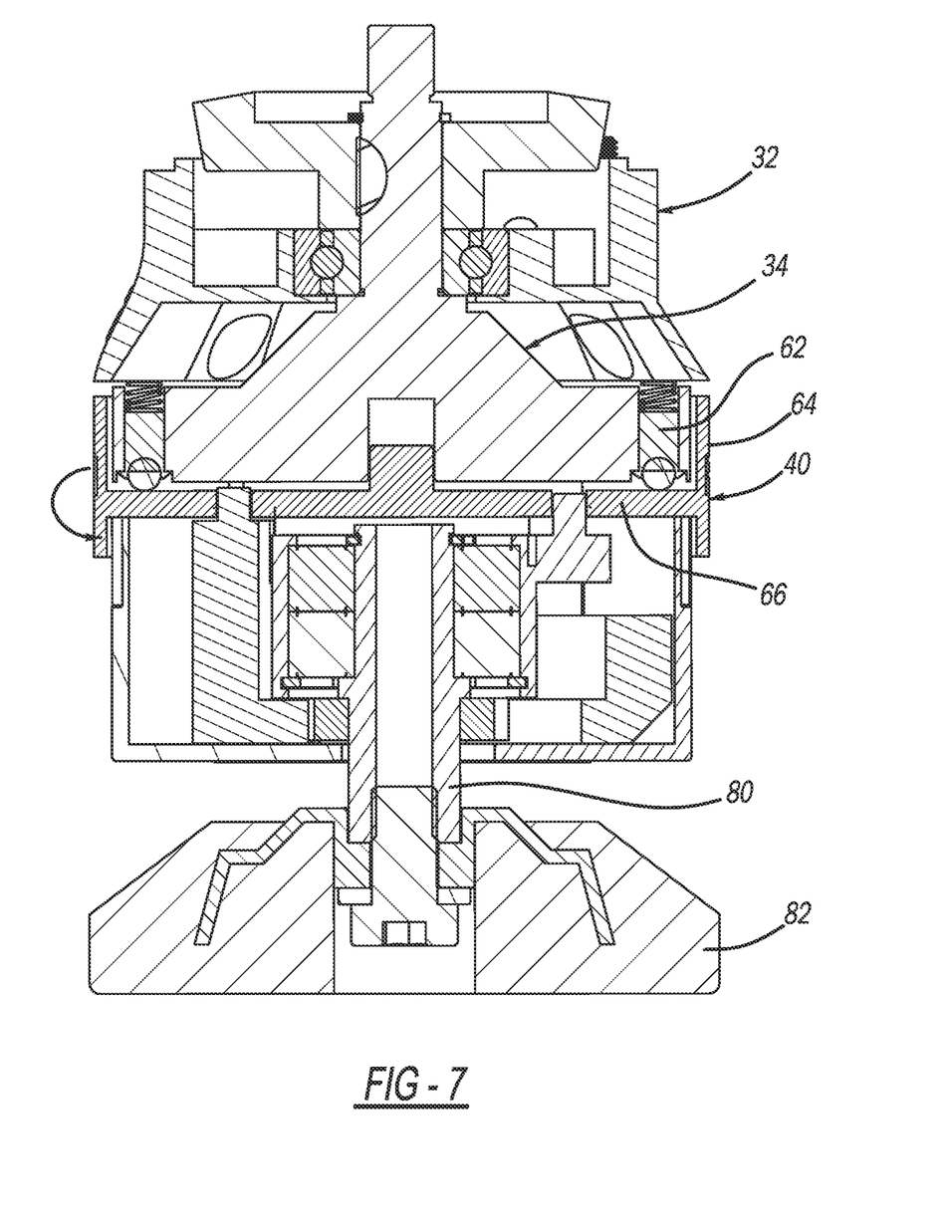
FIG. 7 is a cross-section view like FIG. 6 with the stroke adjuster being rotated.
Figure 8:
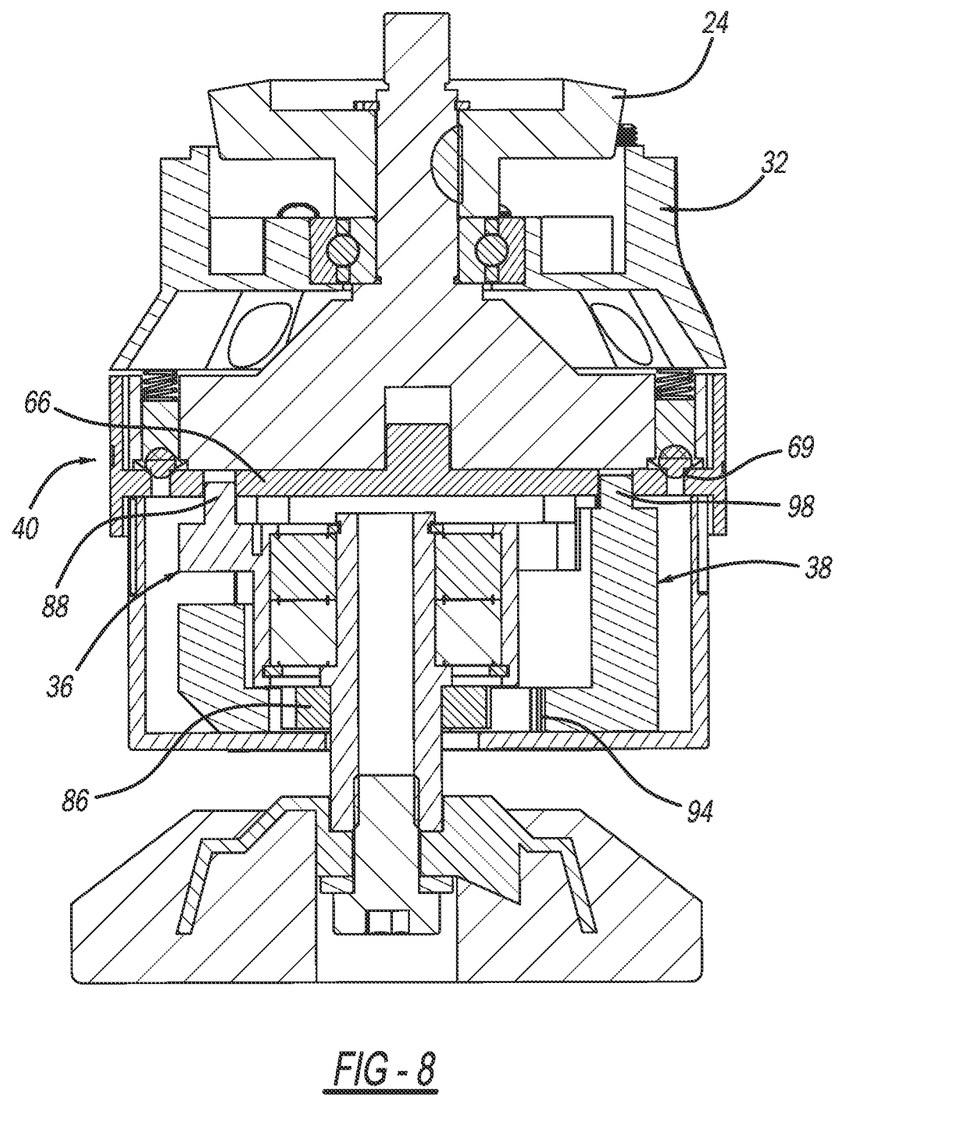
FIG. 8 is a cross-section view like FIG. 6 after rotation.

Turning to FIG. 6, the detent pins 62 are illustrated. The detent pins 62 are received in the cam plate holes 69 locking the stroke adjustment mechanism 40 in a rotary mode position or in a dual action mode position. A biasing member is positioned in the bore 60 so that upon rotation of the stroke adjustment mechanism 40, the cam plate 66 can move over the detent pin 62 into the next position where the detent pin 62 is received in another detent hole 69.

Also, as can be seen in FIGS. 6A and 6B, the cam plate 66 is positioned on the inner surface 58 of the hub body 44 defined by the cutout. The cam plate 66 rotates on the surface between positions.

In operation, the stroke adjustment mechanism 40 ring 64 is rotated. As this occurs, the detent pins 62 are biased away from the cam plate 66 releasing the cam plate 66 from the detent pins 62. The ring 64 continues to turn or rotate until the detent pin 62 engages the next detent hole 69 in the cam plate 66. As this occurs, the adjustable stroke device 30 is locked into a position. The positions move from a purely rotational position to a dual action position.

As the ring 64 is rotated, the pins 88, 98 in the slots 66 are moved. As this occurs, the workpiece mounting assembly 36 and counterbalance mechanism 38 are moved either toward one another or away from one another. In a rotary only position, the workpiece mounting assembly locking gear 86 engages the teeth 94 of the counterbalance mechanism 38. This provides rotational only movement. As the workpiece mounting assembly 36 and counterbalance 38 mechanisms are moved away from one another, the workpiece mounting assembly 36 freely rotates in the counterweight 38 and housing providing the dual action rotary and orbital movement.

Accordingly, the activation switch 16 energizes the motor which rotates the spindle 50 which, in turn, rotates the drive hub 34. This enables the backing plate 84 to be rotated with the counterbalance mechanism 38 balancing the rotational imbalance due to the spindle 78 being offset from the central axis of the spindle 50. Thus, the spindle 78 rotates the workpiece backing plate 84 at a stroke away from the central axis.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. The adjustable stroke device for a random orbital machine comprising:
    a housing having a central axis and a wall defining a cavity;
    at least one counterweight movably disposed at least partially within the cavity;
    a mounting assembly disposed at least partially within the cavity, the mounting assembly including a workpiece attachment mechanism; and
    a stroke adjuster coupling the at least one counterweight with the mounting assembly, the stroke adjuster enabling the at least one counterweight and mounting assembly to move with respect to one another such that a distance between the at least one counterweight and the mounting assembly may be variably adjusted which, in turn, variably adjust a stroke radius of the workpiece attachment mechanism with respect to the central axis of the housing, the stroke adjuster including an adjuster ring and a cam mechanism fixed to the adjuster ring.

2. The adjustable stroke device of claim 1, wherein the adjuster ring surrounding the wall of the housing, the adjuster ring is only rotatable around the central axis.

3. The adjustable stroke device of claim 2, wherein the mounting assembly includes a bearing carriage engaging the cam mechanism for moving the mounting assembly in response to cam movement.

4. The adjustable stroke device of claim 2, further comprising a locking mechanism associated with the mounting assembly to lock the drive in a rotational position.

5. The adjustable stroke device of claim 2, wherein the cam mechanism is directly fixed to the adjuster ring.

6. The adjustable stroke device of claim 1, wherein the counterweight engages the cam mechanism for moving the counterweight in response to cam movement.

7. The adjustable stroke device of claim 1, wherein the workpiece attachment mechanism further comprises a spindle, the spindle coupling with a bearing carriage.

8. The adjustable stroke device of claim 1, further comprising at least one detent for securing the stroke adjuster in position.

9. The adjustable stroke device of claim 1, further comprising a plurality of detents, each detent securing the stroke adjuster in a different operating position.

10. The adjustable stroke device of claim 1, wherein the housing includes a drive hub and a cover.

11. The adjustable stroke device of claim 1, wherein the counterweight is fully disposed in the cavity.

12. A rotating tool comprising:
    a housing and a motor, the motor including a drive train;
    an adjustable stroke device coupled with the drivetrain, the adjustable stroke device comprising:

a housing having a central axis and a wall defining a cavity;

at least one counterweight movably disposed at least partially within the cavity;

a mounting assembly disposed at least partially within the cavity, the mounting assembly including a workpiece attachment mechanism; and a stroke adjuster coupling the at least one counterweight with the mounting assembly, the stroke adjuster enabling the at least one counterweight and mounting assembly to move with respect to one another such that a distance between the at least one counterweight and the mounting assembly may be variably adjusted which, in turn, variably adjust a stroke radius of the workpiece attachment mechanism with respect to the central axis of the housing, the stroke adjuster including an adjuster ring and a cam mechanism fixed to the adjuster ring.

13. The rotating tool of claim 12, wherein the adjuster ring surrounding the wall of the housing, the adjuster ring is only rotatable around the central axis.

14. The rotating tool of claim 13, wherein the mounting assembly includes a bearing carriage engaging the cam mechanism for moving the mounting assembly in response to cam movement.

15. The rotating tool of claim 13 further comprising a locking mechanism associated with the mounting assembly to lock the drive in a rotational position.

16. The rotating tool of claim 13, wherein the cam mechanism is directly fixed to the adjuster ring.

17. The rotating tool of claim 12, wherein the counterweight engages the cam mechanism for moving the counterweight in response to cam movement.

18. The rotating tool of claim 12, wherein the workpiece attachment mechanism further comprises a spindle, the spindle coupling with a bearing carriage.

19. The rotating tool of claim 12, further comprising at least one detent for securing the stroke adjuster in position.

20. The rotating tool of claim 12, further comprising a plurality of detents, each detent securing the stroke adjuster in a different operating position.

21. The rotating tool of claim 12, wherein the housing includes a drive hub and a cover.

22. The rotating tool of claim 12, wherein the counterweight is fully disposed in the cavity.

* * * * *